(12) United States Patent
Yamaguchi et al.

(10) Patent No.: US 6,825,469 B2
(45) Date of Patent: Nov. 30, 2004

(54) VEHICLE VISIBILITY ASSIST DEVICE AND METHOD

(75) Inventors: Ryuji Yamaguchi, Mishima (JP); Yasuo Hagisato, Susono (JP); Kunihiko Toyofuku, Toyota (JP); Shinya Kawamata, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 183 days.

(21) Appl. No.: 10/206,232

(22) Filed: Jul. 29, 2002

(65) Prior Publication Data

US 2003/0025078 A1 Feb. 6, 2003

(30) Foreign Application Priority Data

Jul. 31, 2001 (JP) .................................... P. 2001-232297

(51) Int. Cl.[7] .................................................. G01J 5/00
(52) U.S. Cl. ............................................. 250/330; 345/7
(58) Field of Search ............................... 345/7; 250/330

(56) References Cited

U.S. PATENT DOCUMENTS

| 4,886,328 A | * 12/1989 | Iino ............................. 345/7 |
| 2002/0063778 A1 | * 5/2002 | Kormos ..................... 348/148 |
| 2002/0118282 A1 | * 8/2002 | Nakamura ................. 348/148 |

FOREIGN PATENT DOCUMENTS

| JP | 6-68989 | 9/1994 |
| JP | 2000-215398 | 8/2000 |

* cited by examiner

*Primary Examiner*—Constantine Hannaher
(74) *Attorney, Agent, or Firm*—Finnegan, Henderson, Farabow, Garrett & Dunner, LLP

(57) ABSTRACT

A vehicle visibility assist device is started up when a switching operation of a switch for an external vehicle light is detected and when it is determined by a brightness sensor that it is darker outside of the vehicle than a predetermined threshold. The visibility assist device projects infrared light to a region outside the vehicle, captures a reflection of the light, processes an image of the region outside the vehicle, and projects the image onto a surface visible to the vehicle operator.

16 Claims, 6 Drawing Sheets

FIG. 7

| | | G | F | E | D | C | B | A |
|---|---|---|---|---|---|---|---|---|
| CONTROL STATE | MAIN SWITCH INDICATOR | ON | ON | ON | ON | ON | OFF | OFF |
| | PROJECTION STATUS INDICATOR | ON | OFF | OFF | OFF | OFF | OFF | OFF |
| | RELAY SWITCH | ON | OFF | OFF | OFF | OFF | OFF | OFF |
| | SHUTTER | OPEN | OPEN | CLOSED | OPEN | CLOSED | CLOSED | CLOSED |
| | LCD DISPLAY | ON | ON | OFF | ON | OFF | OFF | OFF |
| | INFRARED CAMERA POWER SUPPLY | ON | ON | OFF | ON | OFF | OFF | OFF |
| INPUT STATUS | VEHICLE SPEED SENSOR | 6km/h OR HIGHER | LOWER THAN 6km/h | — | — | — | — | — |
| | BRIGHTNESS SENSOR | DARK | DARK | LIGHT | DARK | — | — | — |
| | DIMMER SWITCH | Lo | Lo | — | Hi | — | — | — |
| | HEADLIGHT SWITCH/LIGHT CONTROL SWITCH | HEAD OR AUTO | HEAD OR AUTO | — | HEAD OR AUTO | TAIL | — | — |
| | MAIN SWITCH | ON | ON | ON | ON | ON | OFF | — |
| | IGNITION SWITCH | ON | ON | ON | ON | ON | ON | OFF |
| | INPUT CONDITIONS | G | F | E | D | C | B | A |

VEHICLE VISIBILITY ASSIST DEVICE AND METHOD

INCORPORATION BY REFERENCE

The disclosure of Japanese Patent Application No. 2001-232297 filed on Jul. 31, 2001, including the specification, drawings and abstract is incorporated herein by reference in its entirety.

BACKGROUND OF THE INVENTION

1. Field of the Invention

The invention relates to a visibility assist device and method that provides a vehicle operator an image of a road that is difficult to see when driving at night.

2. Description of Related Art

Vehicle visibility assist devices are known. A known device projects light to an area outside a vehicle when it is determined that it is dark outside the vehicle based on detection results from a brightness sensor.

The conventional visibility assist device is activated when it is determined that it is dark outside the vehicle, based on detection results of the brightness sensor. However, the level of darkness in which this kind of visibility assistance is considered necessary differs from individual to individual, and can vary according to light conditions, driving conditions and so on. To leave allowance for these factors, therefore, the visibility assist device may activate while it is still relatively light outside. When this occurs, the amount of time that the visibility assist device is in operation is increased unnecessarily. This increases the amount of power consumed and shortens the life of the system.

It is preferable, therefore, to activate the visibility assist device only when the vehicle operator deems it to be truly necessary. Setting activation conditions to accomplish this result, however, has proven difficult. Because of this problem, conventional visibility assist devices occasionally have not activated under conditions where activation should have occurred, making it difficult for the user to tell whether the device is operating normally.

SUMMARY OF THE INVENTION

The invention has as one object to provide a visibility assist device in which the frequency of unnecessary operation is reduced, and which is capable of reliably activating when deemed necessary by the vehicle operator.

An apparatus according to the invention is provided with a visibility assist device that provides an image outside a vehicle captured by irradiation of an infrared light, a brightness sensor that detects a level of brightness outside the vehicle, and a controller that detects a selected position of a switch of an illumination device that illuminates an area outside the vehicle, and controls startup of the visibility assist device such that the visibility assist device is started when the detected brightness is below a predetermined level and the detected position of the switch of the illumination device of the vehicle indicates that the illumination device has turned on.

When a switch operation to turn on an illumination device, such as a headlight, so as to illuminate the area outside the vehicle is detected, it is assumed that the vehicle operator subjectively feels that it is dark outside. Therefore, the controller starts up the visibility assist device upon establishment of two conditions; i) the illumination device switch position indicates that the vehicle operator subjectively feels it is dark outside the vehicle, and ii) it is objectively determined from detection results of the controller that it is dark outside the vehicle. Having the visibility assist device start up based on these two conditions reduces the frequency of unnecessary operation, and enables the device to turn on when truly necessary, compared with the case where the device is turned on based on establishment of only one of the aforementioned conditions.

The apparatus further includes a main switch that is placed in a selected one of at least two states. The two states include a first state in which startup of the visibility assist device is permitted, and a second state in which startup of the visibility assist device is prohibited. The controller starts up the visibility assist device when the main switch is switched to the first state.

In this way, the controller determines i) whether the vehicle operator subjectively feels that it is dark outside in view of operation of the main switch, ii) whether it is objectively dark outside the vehicle, and iii) whether the vehicle operator intends to use the visibility assist device, i.e., whether there is a need for visibility assistance. The controller therefore starts up the visibility assist device under conditions where its use is truly necessary.

The apparatus further includes an illumination control device that automatically turns on and off the illumination device in accordance with the brightness outside the vehicle, detected by the brightness sensor.

In this way, the brightness detecting unit is used for the controller and the light control system to detect the brightness outside the vehicle. Therefore it is possible to keep the number of parts from increasing and thus keep manufacturing costs down.

In the apparatus, the illumination device preferably is a headlight, and the controller detects a switching operation for turning on and off the headlight. However, the invention is not limited to use with a headlight.

The vehicle operator turns on the headlights when he or she finds it difficult to see the road because it is dark outside the vehicle. Accordingly, the visibility assist device regards a switch operation to turn the headlights on as a sign that it is difficult to see the road because of darkness, and therefore the visibility assist device is deemed necessary. Detection of the illumination device switch operation is used for each of the startup controls described above, thereby enabling the visibility assist device to be started up appropriately when necessary.

An apparatus according to the invention is provided with a visibility assist device that provides an image outside of a vehicle captured by irradiation of an infrared light, an infrared light projecting unit that projects an infrared light to a predetermined region outside the vehicle so as to capture a reflected image of the predetermined region outside the vehicle, and a controller that detects a selected position of a switch of a lighting unit of the vehicle and controls turning the infrared light projecting unit on and off such that the infrared light projecting unit is turned off when it is determined that the lighting unit is in a high-beam state.

For example, the illumination device, such as a headlight, can be configured so as to have two light projecting states; i) a low beam state for lighting an area a relatively short distance in front of the vehicle, and ii) a high beam state for lighting an area a relatively long distance in front of the vehicle, and can be switched between the two states with a switch. Also, as the light irradiated from this type of lighting device includes infrared light, it is also possible to provide an infrared view of a region outside the vehicle by obtaining reflected infrared light from an area to be imaged that is a long distance away by using the high beams to light that region. Therefore, when the illumination device is in the high beam state, the light control device turns off the infrared projecting unit, and an infrared image based on the reflected light of the high beams is obtained such that power consumption is reduced. Although the above discussion relates to vehicle headlights, the invention is not limited to using headlights as the illumination device, and also is not limited to lighting a region in front of the vehicle.

The apparatus is further provided with a brightness sensor that detects brightness outside the vehicle. The controller of the apparatus controls startup of the visibility assist device such that the visibility assist device is started when the detected brightness is lower than a predetermined level and the detected position of the switch of the lighting unit of the vehicle indicates turning the illumination device has been turned on.

When the illumination device is in the high beam state, the light control device turns off the infrared projecting unit so that power consumption is reduced. The controller starts up the visibility assist device upon establishment of two conditions; i) the vehicle operator subjectively feels that it is dark outside, and ii) it is objectively determined based on detection results from the brightness sensor that it is dark outside the vehicle. Having the visibility assist device start up based on these two conditions reduces the frequency of operation of the device, as well as enables the device to start up when truly necessary, compared with being started up based on only one of the aforementioned conditions.

The apparatus is further provided with a first indicator that indicates an operating state of the visibility assist device and a second indicator that indicates whether the infrared light projecting unit is turned on or turned off when the visibility assist device is in the operating state.

By providing the first indicator and the second indicator, it is possible to prevent the vehicle operator from incorrectly assuming that the infrared light projecting device is malfunctioning, when the infrared light projecting device is off during operation of the visibility assist device, just as with the visibility assist device.

The apparatus is further provided with a projecting unit that projects a view of the outside of the vehicle captured by the infrared light onto a projection surface that faces a vehicle operator, and a movable cover member capable of covering the projecting unit.

The projecting function of the projecting unit that projects an infrared view of a region outside of the vehicle may be damaged if directly exposed to sunlight for an extended period of time. Accordingly, covering the projecting unit with a movable cover member when the visibility assist device is not in use protects the projecting unit from direct sunlight.

In the apparatus, the projecting unit projects the infrared light directly to the projection surface.

When the projecting unit is positioned so as not to be exposed to direct sunlight, there may be cases in which an infrared image is unable to be projected from the projecting unit directly onto the projection surface because of the position of the projecting unit. In this case, a light path adjusting member can be provided between the projecting unit and the projection surface, for example. Having the projecting unit project the infrared image directly onto the projection surface without using the aforementioned light path adjusting member, reduces the number of parts, helping to simplify the system configuration.

In the apparatus, the projection surface is a windshield, below which the projecting unit is provided.

In the aforementioned aspect, the windshield serves as the projection surface and the projecting unit is arranged below the projection surface. It is possible to provide a visibility assist device which has superior mountability so as to make effective use of limited mounting space and which is also highly visible by the vehicle operator.

BRIEF DESCRIPTION OF THE DRAWINGS

FIG. 7 is a logic chart for activation showing the input status of each switch operation and the like and the corresponding control states of the visibility assist device according to the exemplary embodiment.

DETAILED DESCRIPTION OF THE PREFERRED EMBODIMENTS

Hereinafter the preferred embodiments of the invention will be described with reference to the accompanying drawings.

Figure 1:
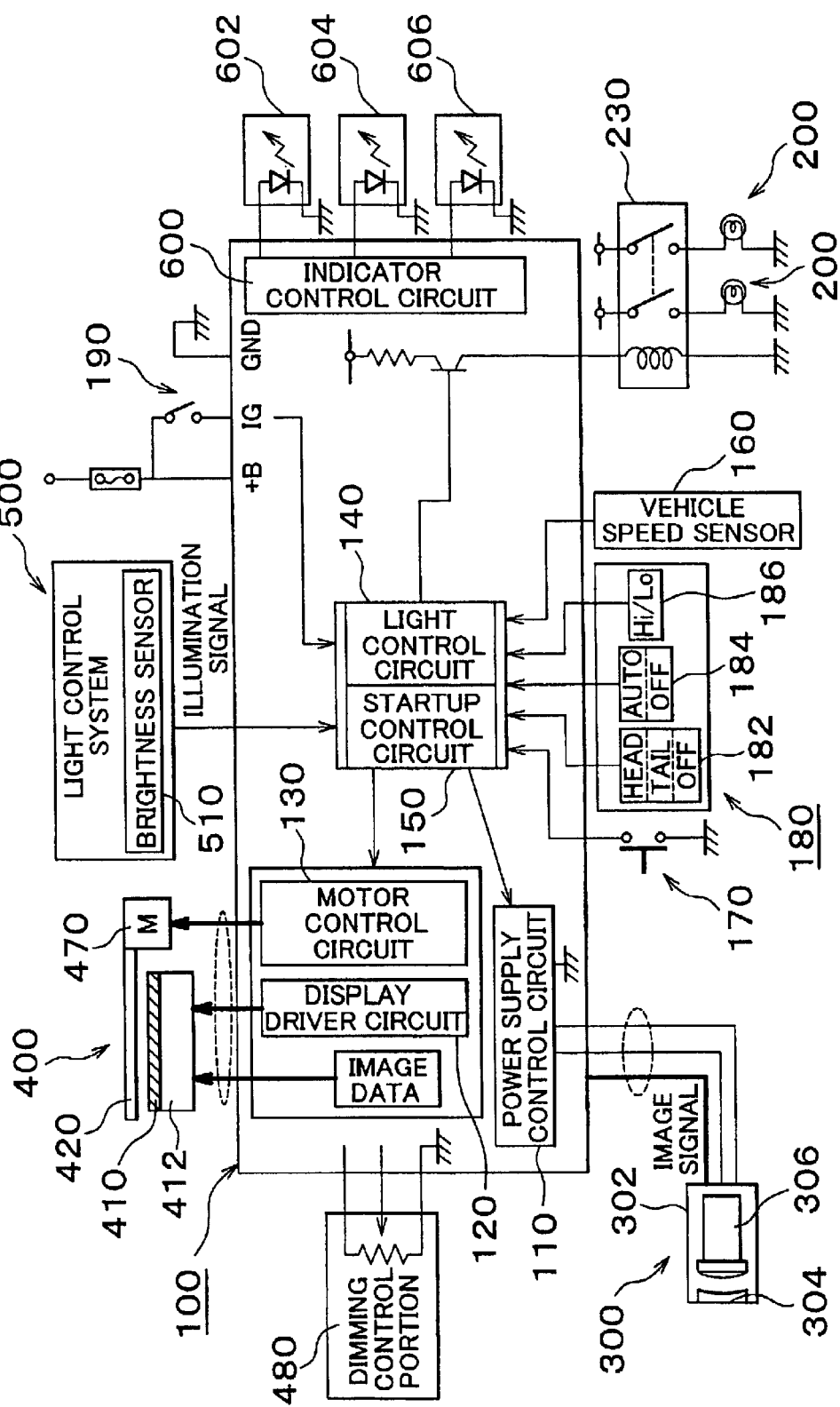
FIG. 1 is a block diagram schematically showing the entire configuration of the visibility assist device.

FIG. 1 schematically shows the entire configuration of an apparatus including the visibility assist device according to one exemplary embodiment of the invention. The visibility assist device includes a controller 100 that performs various types of control of the visibility assist device, an infrared lamp (hereinafter referred to as "IR lamp") 200 that irradiates infrared light to an area to be imaged outside the vehicle, and preferably in front of the vehicle a camera ASSY 300 that captures a reflected image of the infrared light that is projected to an area to be viewed, and a display device 400 (HUD: Headup Display) that displays the reflected infrared image captured by the camera ASSY 300.

Figure 2:
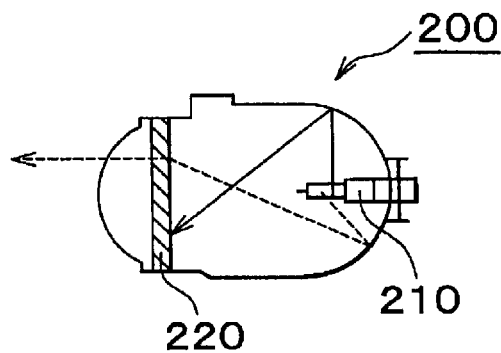
FIG. 2 is an explanatory view schematically showing the configuration of the infrared projecting lamp.

As shown in the schematic view in FIG. 2, the IR lamp 200 is a projection lamp especially for the visibility assist device that projects infrared light in a wavelength region of approximately 800 nm to 1000 nm. The IR lamp 200 preferably uses a halogen lamp 210 as the light source and is provided with a filter 220 to cut visible light. Accordingly, it is possible to project infrared light in an irradiation range corresponding to a high (Hi) beam of a headlight. There are two of the IR lamps 200, one mounted on the left and one mounted on the right near the fog lamp provided on the bumper portion, as shown in FIG. 6.

Figure 3A:
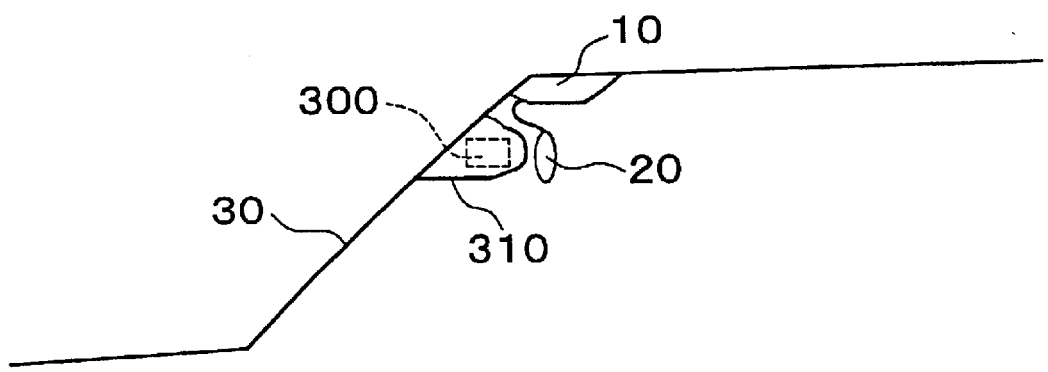
FIG. 3A is an explanatory view schematically showing the mounting position of the imaging camera assembly in the vehicle according to one exemplary embodiment of this invention.
Figure 3B:
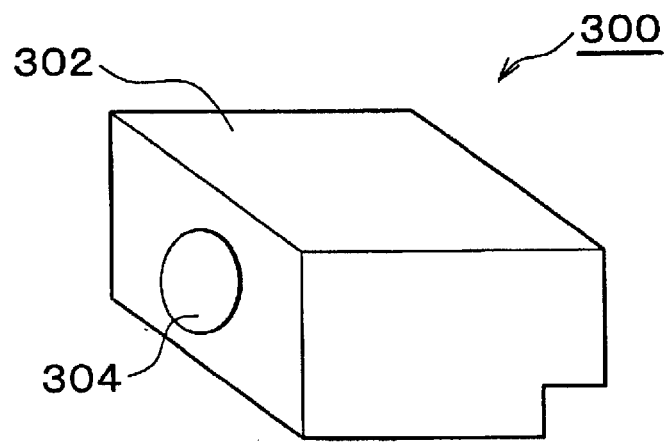
FIG. 3B is a perspective view schematically showing the outward appearance of the imaging camera assembly according to one exemplary embodiment of this invention.
Figure 6:
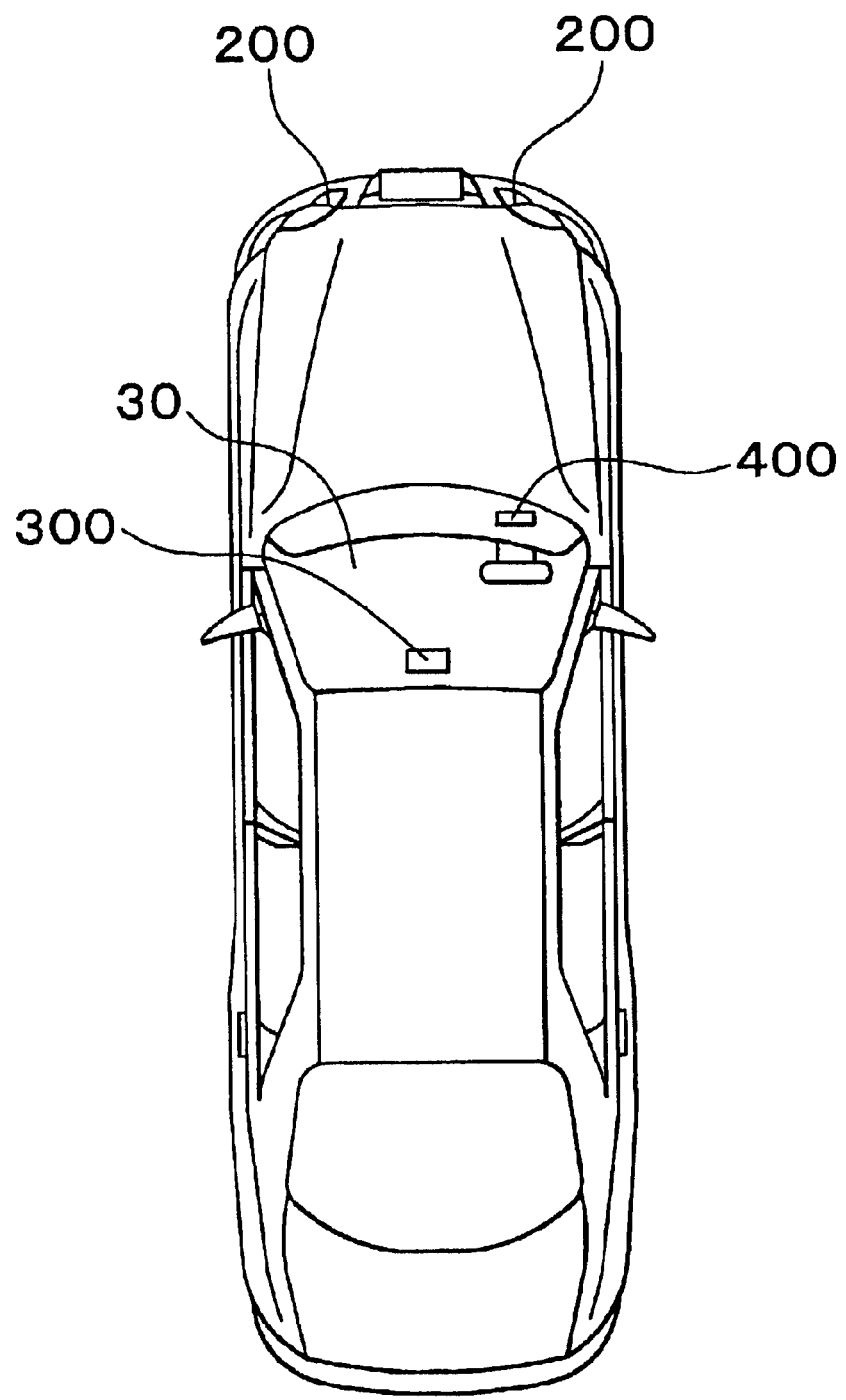
FIG. 6 is an explanatory view showing the mounting position in the vehicle of the infrared projecting lamp, the imaging camera assembly, and the display device according to one exemplary embodiment of this invention.

As shown in FIG. 3A and FIG. 6, the camera ASSY 300 is located below an overhead console 10 inside the vehicle and mounted on the back side of an inner mirror 20. The camera ASSY 300 is adhered and fixed to the inner side of a front glass or a windshield 30, being housed in a fixed box 310. As shown in FIG. 3B, the camera ASSY 300 is provided with a lens 304 on a front portion of a main body 302. An infrared camera 306 (FIG. 1) that captures the reflected light of the infrared light is mounted inside the main body 302 so as to face the lens 304. A reflected infrared image that enters through the lens 304 is captured by the infrared camera 306.

A display device 400 is provided with a liquid crystal display (LCD) 410 for displaying the image from the infrared light captured by the infrared camera 306, as shown in FIG. 1. On a back side of the liquid crystal display 410, a dimmable backlight 412 serves as the projection light source. The display device 400 provides an image (virtual image) to the vehicle operator by reflecting the image displayed by the liquid crystal display 410 onto the windshield 30.

The display device 400 is mounted in a position on an instrument panel 40 in front of the vehicle operator's seat on the back side of a combination meter in which a speedometer and the like are arranged. The liquid crystal display 410 is fixed in a position facing upward because the system displays a virtual image with a single reflection, displaying the image to the vehicle operator by reflecting it on the windshield 30, as described above. Although omitted from the drawing, a semi-transparent reflective thin film is formed on the surface of the windshield 30 that is inside the cabin in a reflection area where the image is to be reflected.

Figure 4:
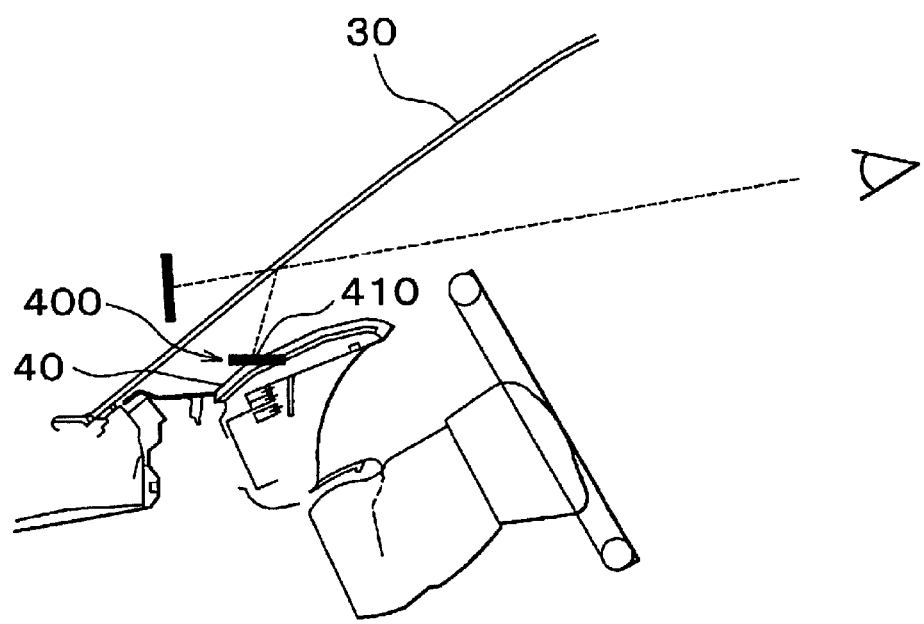
FIG. 4 is an explanatory view showing the mounting position of the display device and the display position of the reflected infrared image with respect to the line of sight of the vehicle operator according to one exemplary embodiment of this invention.

Because the liquid crystal display 410 of the display device 400 faces upward as shown in FIG. 4, it tends to become hot from exposure to direct sunlight. In order to prevent this, a movable shutter 420 is provided to cover the liquid crystal display 410 from above when the display device 400 is not being used.

Figure 5A:
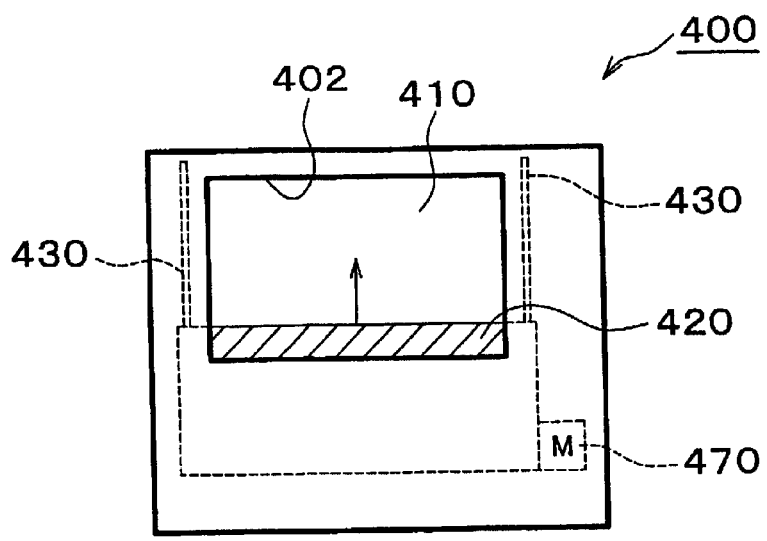
FIG. 5A is a plan view of the display device according to one exemplary embodiment of this invention.
Figure 5B:
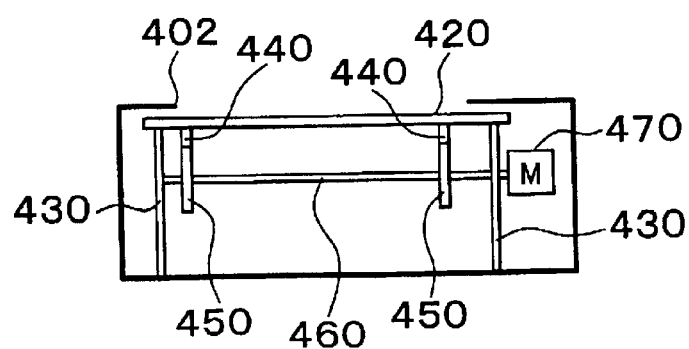
FIG. 5B is a schematic cross-sectional view showing mainly the shutter and the shutter drive mechanism according to one exemplary embodiment of this invention.

This configuration is shown in FIGS. 5A and 5B. The liquid crystal display 410 is arranged below an open portion 402 of the main body of the visibility assist device, and the plate-shaped shutter 420 is arranged in a space between the open portion 402 and the liquid crystal display 410. The shutter 420 is supported at both sides by guide rails 430 so as to be able to move back and forth. Rack rails 440 having a toothed surface on one side are provided on the reverse side of the shutter 420 along the inside of these guide rails 430, respectively. These rack rails 440 are fixed to the shutter 420 side with the toothed surfaces facing down. Gears 450 mesh with the toothed surfaces of these rack rails 440, respectively. Both gears 450 are fixed to a driving shaft 460 that goes through the center portion of both gears 450. The driving shaft 460 is a mechanism that is rotationally driven by a driving motor 470. Therefore, driving the driving motor 470 rotates the gears 450 which are meshed with the toothed surfaces of the rack rails 440 that are fixed to the shutter 420. Accordingly, the shutter 420 moves with the rack rails 440 to cover the liquid crystal display 410 from above. Further, by rotationally driving the driving motor 470 in the reverse direction, the shutter 420 is moved to return to its original position by the same operation such that the liquid crystal display 410 is exposed again.

As described above, various types of control of the visibility assist device, including lighting control of the IR lamp 200 and control for operating the camera ASSY 300 and the display device 400, all can be performed by the controller 100.

The controller 100 is provided with a power supply control circuit 110 that controls the supply of power to the camera ASSY 300. The reflected infrared image captured by the camera ASSY 300 is processed inside the controller 100, converted into image data, and then input into the display device 400.

The controller 100 is also provided with a display driver circuit 120 that controls the display on the display device 400 and a motor control circuit 130 that controls the operation of the driving motor 470 to control the opening and closing of the shutter 420 described above, which serve as a control system for the display device 400. Further, the brightness of the backlight 412 in the display device 400 is controlled based on operation of a dimming control portion 480 such that the brightness of the infrared image that is displayed by the display device 400 is able to be independently adjusted according to the preference of the vehicle operator.

In addition, into the controller 100 are input signals indicative of i) the vehicle speed detected by a vehicle speed sensor 160, ii) the operation state of a main switch 170 that is able to be switched between a state allowing startup of the visibility assist device and a state prohibiting startup thereof, and iii) the operation state of a combination switch 180 in which a plurality of types of vehicle external illumination system switches are integrated.

The combination switch 180 includes a headlight switch 182, a light control switch 184, and a dimmer switch 186 and the like. The headlight switch 182 can be switched between three positions i) an OFF position for turning off all of the lights, ii) a TAIL position for turning on the tail lamps and the small lamps (vehicle parking lights), and iii) a HEAD position for turning on the tail lamps, the small lamps, and the headlights. The light control switch 184 switches between starting and stopping a light control system 500, to be described later. The dimmer switch 186 switches the headlights between high-beam and low-beam.

Meanwhile, the vehicle is provided with a light control system 500 that senses brightness in an area outside the vehicle, and automatically turns the headlights and the like on and off accordingly. For example, at twilight, the light control system 500 automatically turns on the tail lamps and small lamps (vehicle width lamps) and the like, and at night or when in a tunnel, the light control system 500 automatically turns on the headlights. When it is light outside, the light control system 500 automatically turns off the lights.

The light control system 500 is also provided with a brightness sensor (photo sensor) 510 on the instrument panel 40 to detect this type of brightness outside the vehicle. The brightness sensor 510 also outputs an illumination signal indicative of the detected illumination to the controller 100 such that the system is also able to grasp the degree of brightness (lightness/darkness) of the region outside the vehicle on the controller 100 side as well. Therefore, the same brightness sensor 510 is used for the light control system 500 and the visibility assist device.

Into the controller 100 are input detection signals and operation signals from the brightness sensor 510, the vehicle speed sensor 160, the main switch 170, the combination switch 180, and an ignition switch 190 and the like. The light control circuit 140 of the controller 100 collectively determines these signals and controls i) turning a relay switch 230 selectively on and off, ii) turning on of the IR lamp 200, and iii) startup to automatically start up the visibility assist device.

The vehicle is also provided with a main switch indicator 602 that displays the on/off state of the main switch 170 to the vehicle operator, a projection status indicator 604 that indicates to the vehicle operator whether the IR lamp 200 is projecting or not, and an operation status indicator 606 that indicates when the visibility assist device is operating. These indicators are provided because the system automatically starts the visibility assist device when a predetermined condition is fulfilled according to a startup control circuit 150. Even if the main switch 170 is turned on, when the starting conditions on the side of the automatic start system, to be described later, are not fulfilled, such as during the day, for example, the visibility assist device may not activate. Therefore, the main switch indicator 602 and the operation status indicator 606 are provided to notify the vehicle operator that the system is in a READY state even in this kind of situation, i.e., the main switch 170 has been turned on and the visibility assist device is on stand-by. Also, because the infrared light used by the visibility assist device cannot be confirmed with the naked eye, the projection status indicator 604 lights up to the vehicle operator that infrared light is being projected. Luminescence of the main switch indicator 602, the projection status indicator 604, and the operation status indicator 606 is controlled by the indicator control circuit 600 of the controller 100.

The main switch indicator 602 and the operation status indicator 606 also can be configured as a single display light. For example, the display light is turned off when the main switch 170 is turned off, and is turned on when the main switch 170 is turned on. The color of the display light at this time changes according to the state of operation of the visibility assist device. For example, the display light lights up yellow when the visibility assist device is on stand-by when the starting conditions have not been fulfilled, and lights up blue when the visibility assist device is actually operating.

The function of the main switch 170 now will be described. The system is such that main switch 170 is always reset to off when the ignition switch 190 is turned off. Therefore, the main switch 170 is always turned off when the ignition switch 190 is turned on (i.e., the main switch 170 is initially off). As a result, startup control that automatically starts up the visibility assist device is performed under the condition in which the main switch 170 has been turned on, because by turning on the main switch 170 the vehicle operator has expressed a desire to receive the infrared image for visibility assistance.

Next, control processing to be performed by the controller 100 will be described with reference to a chart shown in FIG. 7. The chart in FIG. 7 shows control states of the visibility assist device in accordance with input conditions from each of the switch operations and the like, respectively. The "-" symbol in the chart indicates that the input state to which the symbol corresponds is not taken into consideration.

First, input condition A represents a case in which the ignition switch 190 is off. In this case, under a command from the startup control circuit 150, the power supply control circuit 110 is controlled so that the power supply to the infrared camera 306 is off, the display driver circuit 120 is controlled so as to turn off the display of the liquid crystal display 410, and the motor control circuit 130 is controlled so as to close the shutter 420, such that the visibility assist device is in a non-active state. Further, the light control circuit 140 controls the relay switch 230 so it is off, thus turning off the IR lamp 200, while the indicator control circuit 600 turns off the main switch indicator 602, the projection status indicator 604, and the operation status indicator 606.

Moreover, in input conditions B, C, D, E, F, and G, the ignition switch 190 is turned on. In the input condition B, the main switch 170 is off. In this case, owing to the off-state of the main switch 170, it is assumed that the vehicle operator does not require use of the visibility assist device. So the visibility assist device is controlled to a non-active state, just as in the case with input condition A. Accordingly an explanation thereof will be omitted.

In input conditions C, D, E, F, and G, as the main switch 170 has been turned on, it is assumed that the vehicle operator is expressing an intent to use the visibility assist device. Input condition C requires that the headlight switch 182 has been turned to the TAIL position. With this visibility assist device, it is determined whether the vehicle operator subjectively feels it is dark outside the vehicle based on the operation of the headlight switch 182 and other switches. When the vehicle operator switches the headlight switch 182 to the TAIL position to turn on the tail lamps and small lamps, the visibility assist device determines from this operation that it is not dark enough to require the use of the visibility assist device. In this case, the visibility assist device is controlled to a non-active state, just as with input conditions A and B above. In this case, however, by having the main switch indicator 602 light up when the main switch 170 is turned on, the system indicates that the main switch 170 is on but the system has determined that the situation does not require that the visibility assist device be started up because the vehicle operator switched the headlight switch 182 to the TAIL position, as described above. Control to light up this type of main switch indicator 602 is also performed the same way for input conditions D, E, F, and G, to be described later. Further, in this situation, the operation status indicator 606 is off because the visibility assist device is in a stand-by state.

Input condition D further requires either that the headlight switch 182 be in the HEAD position for turning on the headlights, or that the light control switch 184 be in an AUTO position to start the control that turns on the headlights automatically by the light control system 500. When the headlight switch 182 is in the HEAD position, the control system of the visibility assist device considers it to be dark enough outside the vehicle so that the vehicle operator has a difficult time seeing the road. When the light control switch 184 is turned to the AUTO position, the controller of the visibility assist device turns on the headlights automatically for the vehicle operator based on detection results from the brightness sensor 510 under conditions where the vehicle operator would likely feel it is dark outside. As a result, the headlights are turned on just as they would be by the vehicle operator. Accordingly, for input condition D, the detection results of the brightness sensor 510 also are considered. Input condition D requires that these detection results indicate that it is darker outside than a predetermined threshold level. A further requirement for input condition D is that the dimmer switch 186 be set to a high-beam.

When all of these requirements of input condition D have been met, startup control of the visibility assist device is performed. That is, under a command from the startup control circuit 150, the power supply control circuit 110 is controlled to turn on the power supply of the infrared camera 306, the display driver circuit 120 is controlled to turn on the display of the liquid crystal display 410, and the motor control circuit 130 is controlled to open the shutter 420.

Also in this case, the high-beam of the headlights is turned on. When the headlights are on high-beam, infrared light corresponding to the luminous intensity of the IR lamp 200 is sufficiently irradiated by the high-beam lamp of the headlights. Therefore, in this case, the relay switch 230 is turned off with the light control circuit 140 such that the IR lamp 200 turns off, thus reducing the amount of power consumed. Accordingly, the indicator control circuit 600 is controlled to turn on the main switch indicator 602 and the operation status indicator 606, and turn off the projection status indicator 604.

Next, with input condition E, even if the ignition switch 190 and the main switch 170 are turned on, when it is lighter than the predetermined threshold level outside of the vehicle according to the detection results of the brightness sensor 510, the controller objectively considers that it is not dark enough to require visibility assistance. In this case, control is performed so the visibility assist device shifts to a non-active state (a stand-by state), just as in the case with input condition C, without considering operation of the headlight switch 182 or other switches.

Next, input condition F requires that i) there be intent to use the visibility assist device by the vehicle operator, ii) the vehicle operator subjectively feels that it is dark outside, and iii) it is objectively determined by the detection results of the brightness sensor 510 to be dark outside the vehicle. When these conditions are all met, startup control is performed for activating the visibility assist device.

However, input condition F requires that the dimmer switch 186 be in the position for low-beam. With this type of requirement it might be assumed that a reflected infrared view a greater distance away would be obtained by turning on the IR lamp 200. However, input condition F further requires that the vehicle speed be low, preferably less than approximately 6 km/h. Because there is a tendency for the time that the infrared rays are irradiated at the retinas of the eyes of pedestrians to increase when the vehicle is running at low speeds like this, the IR lamp 200 is turned off for the protection of pedestrians.

Accordingly, when all of the requirements of input condition F have been met, under a command from the startup control circuit 150 the power supply control circuit 110 is controlled to turn on the power supply to the infrared camera 306, the display driver circuit 120 is controlled to turn on the display of the liquid crystal display 410, and the motor control circuit 130 is controlled to open the shutter 420. Furthermore, the light control circuit 140 is controlled to turn off the relay switch 230 such that the IR lamp 200 turns off. Also, the indicator control circuit 600 is controlled to turn on both the main switch indicator 602 and the operation status indicator 606, and turn off the projection status indicator 604.

Next, input condition G has the same requirements as input condition F except for vehicle speed. Here, input condition G requires that the vehicle speed be 6 km/h or more. When the vehicle is running above a certain speed like this, the time that the infrared light is irradiated at the retinas of the eyes of pedestrians is short. Therefore, when the vehicle speed is approximately 6 km/h or more, in addition to the control state of input condition F, the light control circuit 140 is controlled so as to turn on the relay switch 230 such that the IR lamp 200 is turned on. As a result, it is possible to obtain a reflected infrared view of farther away. Also, the indicator control circuit 600 is controlled so as to turn on the main switch indicator 602, the projection status indicator 604, and the operation status indicator 606.

With the visibility assist device according to the exemplary embodiment described above, approximately 6 km/h was given as an example of the threshold for the vehicle speed requirement in input conditions F and G. However, the invention is not limited to this speed threshold. Alternatively, a threshold of a low vehicle speed other than this can also be used.

Moreover, in the example with input condition D according to the exemplary embodiment, the IR lamp 200 is turned off when the headlights are on high-beam. However, the invention is not limited to this condition. Alternatively, a reflected infrared image can also be obtained with both the IR lamp 200 and the high-beams turned on.

As described above, the visibility assist device in the foregoing description is provided with a controller for starting up the visibility assist device when i) the illumination level detected by a brightness sensor is darker than a predetermined level, and ii) a lighting operation of a illumination device is detected by the controller. In this way, because the visibility assist device is started when two conditions are satisfied, including i) the vehicle operator subjectively feels that it is dark outside, and ii) it is objectively determined by dark outside, unnecessary operation of the device is reduced and the visibility assist device is reliably activated in conditions where it is really necessary. As a result, power consumption is reduced and the life of the device is generally extended because the frequency of unnecessary use is reduced.

The visibility assist device in the foregoing description is provided with a controller for turning off the infrared projecting unit when it is detected that the illumination device is projecting light at high-beam. Therefore, because infrared light, which is projected when the high-beams are turned on to light up the distance and which corresponds to the luminous intensity of the infrared light projecting unit, is used, power consumption at this time is able to be reduced compared to the case when the infrared light projecting unit is turned on. Further, a reflected infrared image is able to be obtained that is the same as is obtained when the infrared light projecting unit is turned on.

The visibility assist device in the foregoing description is provided with projecting unit for projecting an image onto a projection surface opposite the vehicle operator, and a movable cover member to cover the projecting unit. Accordingly, by covering the projecting unit with the movable cover member when the visibility assist device is not in use, the projecting unit is protected from direct sunlight. Further, by providing this type of movable cover member, it is possible to position the projecting unit in a location where it will be exposed to sunlight, thereby improving the degree of freedom in mounting. Moreover, the vehicle operator is able to tell whether the visibility assist device is in operation or not by seeing whether the projecting unit is covered by the movable cover member. In addition, by employing a configuration in which the projecting unit projects the image directly onto the projection surface, the number of parts can be reduced, thus simplifying the construction of the device.

What is claimed is:

1. An apparatus comprising:
    a visibility assist device for providing an image outside a vehicle captured by irradiation of an infrared light;
    a brightness sensor for detecting brightness outside the vehicle; and
    a controller for detecting a position of a switch of an illumination device that illuminates a region outside the vehicle; and for controlling startup of the visibility assist device such that the visibility assist device is started when the detected brightness is lower than a predetermined level and the detected position of the switch of the illumination device of the vehicle indicates the illumination device is on.

2. The apparatus according to claim 1, further comprising a main switch configured to be placed in a selected one of at least two states, including a first state in which startup of the visibility assist device is permitted, and a second state in which startup of the visibility assist device is prohibited, wherein the controller performs the startup of the visibility assist device when the main switch is switched to the first state.

3. The apparatus according to claim 1, further comprising an illumination control device that automatically and alternatively turns on and off the illumination device in accordance with the detected brightness outside the vehicle.

4. The apparatus according to claim 1, wherein the illumination device comprises a headlight, and the controller detects a switching operation for alternately turning the headlight on and off.

5. The apparatus according to claim 1, further comprising:
   a projecting unit that projects an image of the region outside of the vehicle captured by the infrared light onto a projection surface visible to a vehicle operator, and
   a cover member for covering the projecting unit.

6. The apparatus according to claim 5, wherein the projecting unit projects the infrared light image directly to the projection surface.

7. The apparatus according to claim 5, wherein the projection surface comprises a windshield, and the projecting unit is provided proximate the windshield.

8. An apparatus comprising:
   a visibility assist device that provides an image outside a vehicle captured by irradiation of an infrared light;
   an infrared light projecting unit that projects an infrared light to a predetermined region outside the vehicle so as to capture a reflected image of the predetermined region outside the vehicle; and
   a controller for detecting a selected position of a switch of an illumination device of the vehicle, the illumination device having a high beam state and a low beam state, and for controlling the infrared light projecting unit such that the infrared light projecting unit is turned off when it is determined that the illumination device is in the high-beam state.

9. The apparatus according to claim 8, further comprising a brightness sensor that detects brightness outside the vehicle, wherein the controller controls startup of the visibility assist device such that the visibility assist device is started when the detected brightness is lower than a predetermined level and the detected position of the switch of the illumination device of the vehicle indicates startup of the illumination device.

10. The apparatus according to claim 9, further comprising:
    a first indicator indicating an operating state of the visibility assist device: and
    a second indicator indicating whether the infrared light projecting unit is on or off.

11. The apparatus according to claim 10, further comprising a main switch that is placed in a selected one of at least two states including a first state in which startup of the visibility assist device is permitted and a second state in which startup of the visibility assist device is prohibited, wherein the first indicator comprises a third indicator that indicates an operating state of the main switch and a fourth indicator that indicates an on/off state of the visibility assist device.

12. The apparatus according to claim 8, further comprising:
    a first indicator indicating an operating state of the visibility assist device: and
    a second indicator indicating whether the infrared light projecting unit is turned on or off.

13. The apparatus according to claim 8, further comprising:
    a projecting unit for projecting an image of a region outside the vehicle captured by the infrared light onto a projection surface visible to a vehicle operator, and
    a cover member capable of covering the projecting unit.

14. The apparatus according to claim 13, wherein the projection surface comprises a windshield, and the projecting unit is provided proximate the windshield.

15. The apparatus according to claim 8, further comprising:
    a cover member capable of covering the projecting unit, wherein the projecting unit projects the infrared light image directly to a projection surface.

16. The apparatus according to claim 15, wherein the projection surface comprises a windshield, and the projecting unit is provided proximate the windshield.

* * * * *